United States Patent [19]
Dempster et al.

[11] Patent Number: 5,459,473
[45] Date of Patent: Oct. 17, 1995

[54] G P S RECEIVER

[75] Inventors: Andrew G. Dempster, Ainslie; Roderick C. Bryant, Isabella Plains; Stanley L. Dougan, Calwell; Harry Tagaris, MacGregor, all of Australia

[73] Assignee: Sigtec Navigation Pty Ltd., Canberra, Australia

[21] Appl. No.: 50,306

[22] PCT Filed: Sep. 12, 1991

[86] PCT No.: PCT/GB91/01555

§ 371 Date: Nov. 22, 1993

§ 102(e) Date: Nov. 22, 1993

[87] PCT Pub. No.: WO93/05407

PCT Pub. Date: Mar. 18, 1993

[51] Int. Cl.$^6$ .............................. G01S 5/02; H04B 7/185; H04B 15/00
[52] U.S. Cl. .............................. 342/357; 375/200
[58] Field of Search .................... 342/357; 375/1

[56] References Cited

U.S. PATENT DOCUMENTS

| | | | |
|---|---|---|---|
| 4,578,678 | 3/1986 | Hurd | 342/357 |
| 4,701,934 | 10/1987 | Jasper | 342/357 |
| 4,807,256 | 2/1989 | Holmes et al. | 342/357 |
| 4,959,656 | 9/1990 | Kumar | 342/357 |
| 5,019,824 | 5/1991 | Kumar | |
| 5,192,957 | 3/1993 | Kennedy | 342/357 |
| 5,223,843 | 6/1993 | Hutchinson | 342/357 |

FOREIGN PATENT DOCUMENTS 2241799  9/1991  United Kingdom.

*Primary Examiner*—Gregory C. Issing
*Attorney, Agent, or Firm*—Spencer, Frank & Schneider

[57] ABSTRACT

A GPS receiver for use with the NAVSTAR global, satellite based radio navigation and time transfer system wherein transmission from each of a plurality of satellites, includes C/A code signals comprising a code and data modulated carrier, said receiver comprising means for receiving C/A code signals transmitted from at least four satellites and means to process the signals including an opoen loop estimator of signal parameters for phase-coherent estimation of a plurality of signal parameters including code delay, carrier frequency, carrier phase, carrier phase acceleration, data value and data delay.

25 Claims, 3 Drawing Sheets

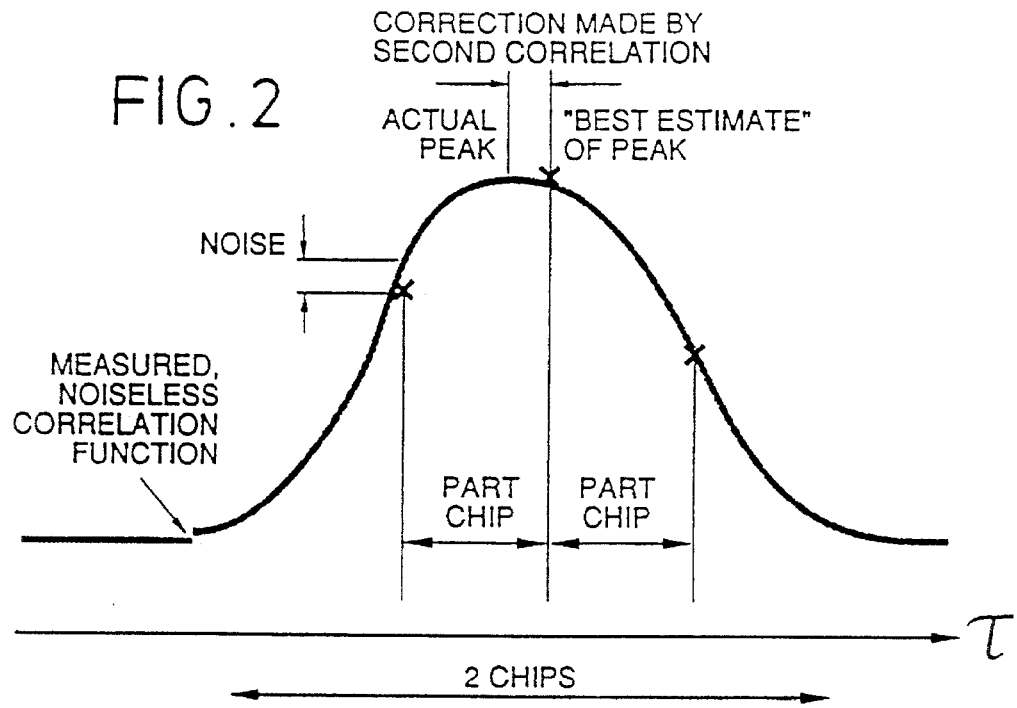
FIG. 2
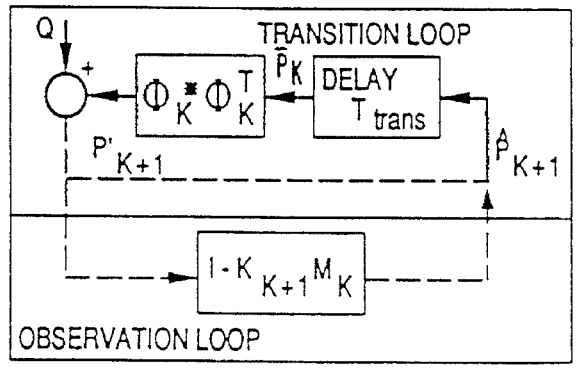
FIG. 3
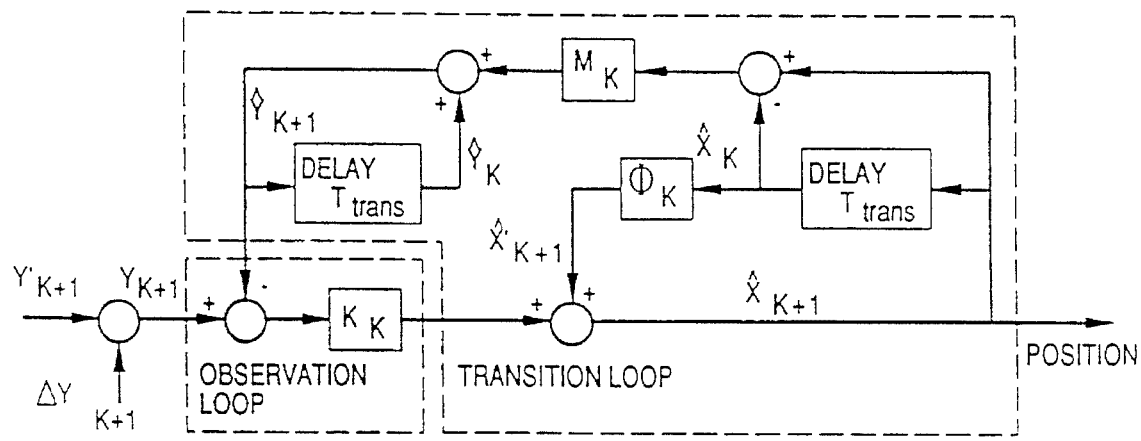

G P S RECEIVER

BACKGROUND OF THE INVENTION

The invention relates to a radio receiver and in particular to a GPS receiver for use with the NAVSTAR Global Positioning System.

The NAVSTAR Global Positioning System is a global, satellite-based radio navigation and time transfer system using the satellite constellation of the US Department of Defence. This constellation will comprise at least 21 satellites positioned in a plurality of orbital paths at a predetermined distance above the Earth and arranged so that, at any time, at substantially any position on the Earth, there will be at least four satellites above the horizon. There is a satellite control station which, inter alia, controls highly accurate clocks in the satellites, synchronises the clocks, determines the orbits of the satellites and uploads orbital information to the satellites for retransmission to users.

Each satellite in the constellation transmits two unique direct-sequence spread spectrum messages in phase quadrature on each of two L-band frequencies. The receiver described here only processes the C/A (Coarse/Acquisition) code message on the L1(1575.42 MHz) carrier; but the principles discussed also apply to the P (Precise) code signals on L1 and L2. The direct sequence code signal, which has a frequency of 1,023 Mchips/sec, and a code epoch repetition rate of 1 kHz, modulates the carrier in a binary phase shift keyed (BPSK) manner. This spread signal is further BPSK modulated by a 50 bps data signal. The data includes information which allows the receiver to measure the range between the receiver and the satellite, i.e. data which allows modelling of the spacecraft orbit (ephemeris) and timing information referenced to the precise satellite clock. The receiver clock will always have an offset with respect to the satellite clock, so these range measurements are known as pseudoranges. To perform a position solution, four pseudorange measurements are required—to solve for the four variables x, y, z and the local clock offset. To further enhance the accuracy of the position solution more measurements can be made—over time (several measurements from the same satellites), over a larger satellite set, or over a wider range of satellite signal variables, such as phase and phase rate.

A position reporting system employing NAVSTAR GPS satellite signals is described in our Co-pending Australian application No. 63995/90.

Many factors influenced the basic design of the GPS receiver of the invention. In addition to particular customer requirements, several design desiderata were identified.

Firstly, the receiver design should be flexible enough to be used in many applications. This implies a modular design with individual modules being interchangeable. In addition, the proportion of the receiver functionality to be provided by software should be optimised, with the software written in modular form, preferably in a high-level language.

Secondly, the receiver design should be suitable for a variety of potential environments. This implies the use of appropriate margins and packaging for the hardware design. More important is the ability of the signal processing to operate under various dynamic conditions, such as those due to vehicle manoeuvring dynamics, or vibration and intermittent blocking of the satellite signals.

Thirdly, a high performance low cost receiver implies the minimisation of production costs which may be achieved by minimizing hardware, either by maximizing the functionality provided by software, or by using a high-density packaging technique, or both. In addition, the receiver is designed to use the C/A code, as opposed to the more complex P code.

Fourthly, using C/A code, a receiver can be almost as accurate as a P code receiver, when it is used in the differential mode. This requires an accurately-positioned base station to provide systematic error corrections of the pseudoranges to the receiver. The receiver must measure the pseudoranges (and any other parameters) to the resolution and accuracy required for the accurate solution, and thus the measurement error and resolution must be much less than the systematic errors which are being removed.

Fifthly, for portability and convenience, the receiver must be designed for minimum mass and volume. In addition, as many proposed applications are for remote, portable use, with power supplied by batteries, power consumption should be minimised. Again, high-density packaging techniques are important.

A known GPS receiver of the closed loop type employs two loops: a code-locked loop which extracts the code delay estimate (pseudorange), and a phase-locked loop (typically a Costas loop) for extraction of the data. The Costas loop may also be used to make ongoing measurements of carrier parameters such as phase and phase rate. In the code-locked loop, a replica of the satellite code is used to despread the received signal, and a data-modulated carrier replica is used to coherently demodulate the despread signal. The resultant energy in each of the early and late channels is balanced in order to align the replica with the received signal. In the Costas loop, the data is demodulated by coherent demodulation.

This phase-locked approach only approximates optimality. Another problem is its susceptibility to loss-of-lock and cycle-slips in low signal to noise ratio (SNR) situations such as in the presence of high noise or vibration or under jamming conditions. The code-locked loop also suffers degraded performance, but is less significant. with respect to total receiver performance. The problem is prevalent in dynamic conditions. However, even in low dynamic conditions such as for high accuracy surveying applications, cycle-slip probability becomes significant since the relevant measurements take long periods of time.

Another type of GPS receiver employs an open loop estimator of signal parameters. In particular, a generic correlation receiver may be used to be the maximum likelihood estimator (ML) of signal parameters. Estimates are made of a selection of signal parameters which are processed to provide a position solution.

The dynamic performance of an open loop design is superior to that of a closed loop design because the former is not subject to the phenomena of cycle slipping and loss of carrier lock. It follows from this that open loop receiver designers have more freedom to vary parameters to meet varying application requirements. Furthermore, an open loop design many be implemented more cost-effectively because of the modularity of the basic processes and because the designer is far less constrained in terms of allowable processing delay.

SUMMARY OF THE INVENTION

A high dynamic global positioning system receiver is described in U.S. Pat. No. 4,578,678 by W. J. Hurd. Unlike the Hurd receiver, the receiver of the present invention operates phase coherently. This results in a significant improvement in SNR. Further, without a phase coherent approach, the carrier phase parameter cannot be measured. The present invention also allows an increased number of parameters to be used in a position solution leading to greater accuracy. Whereas Hurd used the P code, the receiver of the present invention uses the C/A code leading to a significant simplification of the hardware and processing software. The Hurd design relies on application-specific hardware and software. Because the processing is performed in software, the receiver of the present invention is more flexible catering for many different applications simply by changing the algorithms of the receiver software. Another advantage over Hurd, is the control the processor has over the frequency of the local code generator which allows optimisation of the measurements made of the signal parameters.

The GPS receiver according to the present invention produces estimates of code delay, carrier frequency, carrier phase, carrier phase acceleration, data value and data delay. It produces these estimates using open-loop correlation techniques. Because it uses multiple optimal parameter estimates, the receiver is highly accurate. The open-loop nature of the receiver makes it comparatively immune to high vibration or high dynamics environments and allows it to operate reliably under intermittent signal blocking. In addition, with the majority of the signal processing being performed in software, the receiver is both low cost and versatile.

Accordingly, the invention comprises a GPS receiver for use with the NAVSTAR global, satellite-based radio navigation and time transfer system wherein transmission from each of a plurality of satellites includes C/A code signals comprising a code and data modulated carrier, said receiver comprising means for receiving C/A code signals transmitted from at least four satellites and means to process the signals including an open loop estimator of signal parameters for phase-coherent estimation of a plurality of signal parameters including code delay, carrier frequency, carrier phase, carrier phase acceleration, data value and data delay.

BRIEF DESCRIPTION OF THE DRAWING

Receivers incorporating the principles of the invention may be designed for many various applications which may involve a variety of environmental and dynamic conditions. So as to provide a more detailed illustration of the invention, one embodiment thereof will be described with reference to the accompanying drawings, in which:

FIG. 2 illustrates raw pseudoranges on a Correlation Diagram; and

FIG. 3 is a block diagram of a Kalman Filter.

DESCRIPTION OF THE PREFERRED EMBODIMENT

For ease of estimation of the signal parameters, and for the elimination of systematic errors, three of the parameters are not estimated directly, but as differences between the selected satellites. Rather than producing four estimates of the four pseudoranges, the shortest pseudoranges is nominally assigned the value zero, and the others are thus assigned the value by which they exceed this one. This has been shown to introduce no errors in the position solution, since one of the variables for which solution is required is the clock offset. This method of estimation effectively sets the value of the clock offset to the value of the shortest pseudorange. Not only are errors common to each channel eliminated by this approach, but the number of bits required to describe the pseudoranges is reduced by more than one quarter, which reduces the size of the message required to be sent to the base station when differential positioning is being used. For the phase, phase rate (frequency) and phase acceleration parameters, differences are also estimated. This eliminates errors common to the estimates from different satellites such as those due to reference oscillators phase fluctuations.

HARDWARE

Figure 1A:
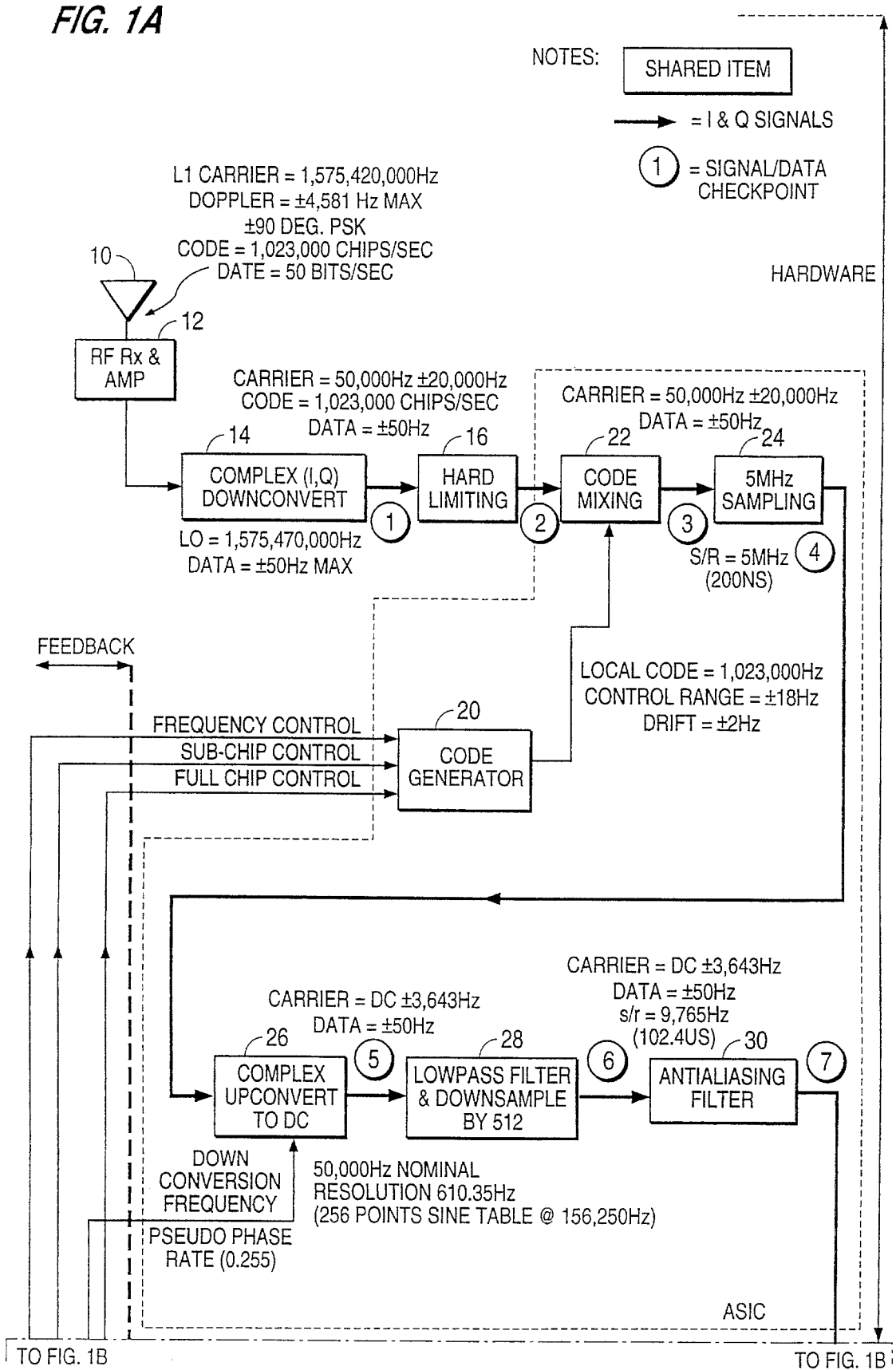
FIGS. 1A and 1B illustrate a functional block diagram of one receiver in accordance with the invention.
Figure 1B:
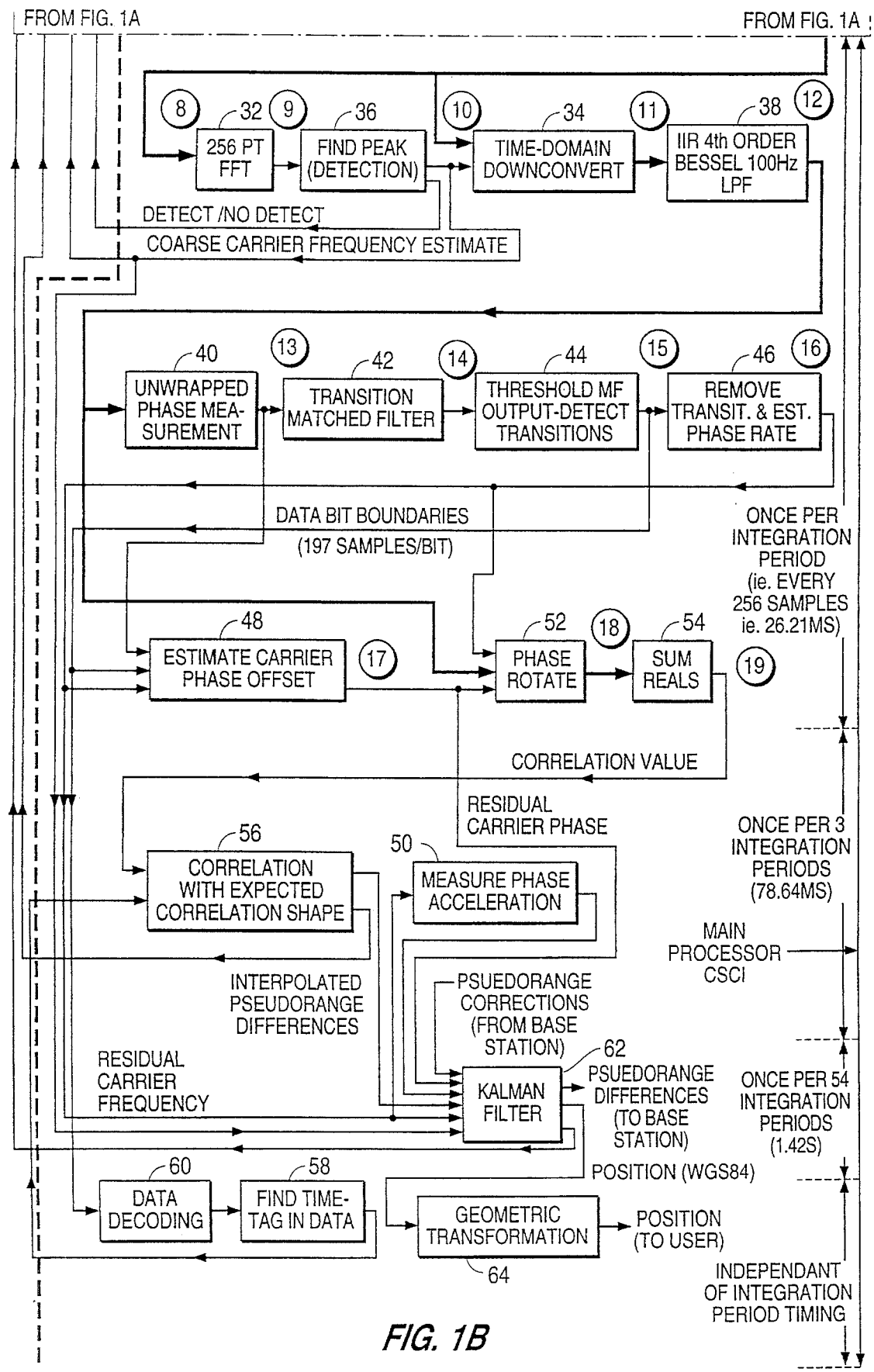

FIGS. 1A and 1B illustrate the architecture for the receiver of this embodiment. The functional blocks are divided between hardware (FIG. 1A) and software (FIG. 1B) performed by a digital signal processor. The hardware performs amplification, downconversion and filter functions, all of which are "normal" functions to be performed in hardware. The down-conversion is "pseudo-single-stage", i.e. the carrier is converted down to a frequency only slightly (with respect to the carrier frequency and signal bandwidth) above dc. This offset permits self-detection products and local oscillator feed-through products to be filtered out. Because the offset is very small compared to the signal bandwidth, it is necessary to generate in-phase and quadrature components. More specifically, referring to FIG. 1A, a signal having a primary carrier frequency of 1575.42 Mhz is received by an antenna 10, amplified in an amplifier 12 and down-converted to a frequency of about 50 Khz in a down-converter 14. The output of down-converter 14, which contains the C/A code and data at 50 Hz, is hard limited in limiter 16.

In this embodiment, the code generation and mixing are also performed in hardware under control of the main processor, by a code generator 20 and a code mixer 22 which receives a binary signal from limiter 16. A further down-conversion to substantially DC is also performed at this point in an upconverter 26 after sampling the output of mixer 22 in a sampler 24 using a hard-limited "complex" local oscillator. The local oscillator frequency is controlled from the processor to allow for drift and predictable Doppler shift thereby increasing the effective range of carrier frequencies that the receiver can handle. Mixing is performed digitally, in a binary way, the received signal being hard-limited, i.e. it is represented by a binary "1" if positive, and "0" if negative. Hard-limiting results in a loss in SNR, but the simplifications that it allows in the hardware outweigh this disadvantage.

Code mixing results in a signal of bandwidth roughly twice the code frequency, i.e. = 2 MHz, unless the codes are "perfectly" matched. This signal is sampled at 5 MHz in sampler 24 and is then low-pass filtered and downsampled to 9765 Hz by filter 28, which is low enough for software to be used for processing.

This filter/downsampler 28 is realised as an integrate-and-dump, integrating(counting) a number of input samples and providing a single output sample. An integrate-and-dump filter has a sine-function frequency response which has its first zero at the sampling frequency. This means that there is a significant amount of the passband above the Nyquist frequency. Signal and noise frequency components in this region are thus passed as noise due to aliasing. This problem can be simply solved if, for the same output sampling rate, twice as many input samples are integrated. This means that a given output sample is the sum of the previous two integrate-and-dumps. This second summing, known as the anti-aliasing filter 30 is performed in the hardware.

MAIN PROCESSOR

Up until this point, the receiver functional blocks have been operating either continuously, or if sampled, each sample has had no special meaning with respect to its position in time. In the main processor, all of the algorithms are based around a time unit known as the "integration period", =25 ms. Certain algorithms are performed each integration period; others are performed once every 3 or 54 integration periods, as shown in FIG. 1B.

Also, some of the main processor algorithms are performed according to the acquisition status of the receiver, i.e. whether a satellite has been acquired or not. The incoming signal is transformed into the frequency domain by the use of a Fast Fourier Transform (FFT) carried out in a 256 bin FFT unit 32. Each bin in the FFT unit 32 is checked for magnitude. If no bin exceeds a threshold, the satellite signal is assumed to be not acquired, and the main processor waits for the next integration period. If the threshold is exceeded, the bin in which the maximum occurs is downconverted by time-domain down-converter 34 in accordance with the output of peak detector 36 to the zero Hz bin, and a narrow low-pass infinite impulse response (IIR) filter 38 is applied in the time domain. An output of peak detector 36 provides full chip control to code generator 20 and a coarse carrier frequency estimate to the complex upconverter unit 26. The signal at this stage is the carrier, spread by the 50 Hz data.

The unwrapped phase of this signal is determined, and is differentiated across the integration period by measuring the unwrapped phase in a phase measurement unit 40, filtering the output by a transition matched filter 42, detecting the data transitions in a threshold output-detect unit 44 by thresholding the unwrapped signal and removing the data transitions, and establishing a phase rate at unit 46. The outputs of units 40, 44 and 46 are input to a carrier phase offset estimating unit 48, and the output of unit 46 is also input to a phase acceleration measurement unit 50. This allows detection of the data bit transitions (180° phase transitions). Once the locations of a string of transitions have been located, the data can be decoded. This operation looks for the repeated framing information, which, once acquired, removes the polarity ambiguity, and the rest of the data can be decoded. The aims of this decoding are to establish the time of transmission of the data transitions, and to extract the ephemeris data, which describes the satellite orbit to a high degree of precision.

Based on these detected transitions, the signal is despread at phase rotator 52 by multiplication by a replica of the detected data. Optimum detection can be guaranteed by performing several of these despreading operations around the detected transitions, and picking the peak of the correlation function for the data delay parameter. Once the signal has been despread with respect to data, nominally leaving only the carrier, the phase is measured once again. A linear fit is made to this phase function. This produces a least-squares estimate of the phase rate over the integration period. The phase of the signal is then rotated using the transform by which the line produced by the linear fit is transformed to the real axis. The sum of the real values of this rotated signal which is obtained at summer 54 is effectively the phase-coherent correlation of the signal. One of these correlation values is produced each integration period. A threshold set on the correlation value may also indicate that a satellite has not been acquired.

In order to measure the pseudoranges, an estimate of the code delay must be made. In this receiver, pseudoranges are not measured directly but as differences between satellites. The pseudorange of one satellite is assigned the value zero, the others are assigned the difference between this pseudorange and the pseudorange in question. By measuring differences, the receiver is simplified in that a high-resolution clock is not required, and communications with the base station are simplified.

The code delay is estimated by setting the code generator 20 (FIG. 14) at three different "phases" for three successive integration periods. These three phases are "locked" (i.e. local and satellite codes are aligned), part of a chip early, and part of a chip late. From these three code phases, the correlation function can be reconstructed. The optimum way to reconstruct the correlation function, and pick the peak is to correlate at correlation unit 56, to which is input the output of summer 54 and a time tag obtained from a time tag unit 58, the measured correlation function, sampled at the three points, with the expected correlation function, which can be measured a priori. Unit 58 receives the output of unit 44 via a data decoder 60. By using this double-correlation technique, raw pseudo-range estimates are produced. The use of this second correlation is necessary to optimise the use made of the three integration times contributing to the measurement. Each of the three correlation samples is produced by observing the signal for one integration period only but the total measurement time is three integration periods. The noise on the samples is independent between samples. Therefore this sampled correlation curve is sub-optimal. Correlating it with the expected correlation function maximises the correlation signal-to-noise ratio, thereby restoring the process to its optimum functioning, and allowing the samples to be interpolated.

In order to meet the requirements for accurately measuring the pseudorange differences, phase differences, frequency differences and phase acceleration differences, the signal must be observed for a much longer period than an integration period (the length of which is set by signal detection requirements). In other words, the raw estimates must be combined in some optimal way in order to generate a more accurate estimate. The method selected for combining the estimates is to use a Kalman filter 62. Inputs to the filter 62 are the estimates of pseudorange, frequency and phase differences, and the pseudorange corrections from the base station. This filter models the receiver position, satellite and receiver motion, and receiver oscillator drift. From these models and the inputs, it produces not only smoothed but uncorrected pseudoranges, for transmission to the base station, but also estimates of the receiver position to the user by means of a geometric transformation in unit 64. These estimates are presented to the user in a standard reference system, which requires a geometric transformation.

CORRELATION

The Maximum Likelihood (ML) estimator is a correlation detector. The signal parameters of interest are code value, signal delay (measured using code delay and data delay), carrier frequency, carrier phase, and data value. The receiver must effectively perform a six-dimensional correlation and pick its peak to determine the optimal estimates of all parameters, in order to derive the optimal position solution.

Two other parameters that arise in the estimation process are the local oscillator drift, and the code generator frequency. The oscillator drift is of interest since all of the measurements of time made in the receiver are made with reference to the one oscillator, which is used for the local oscillator and sampling clocks. The Kalman output of the filter 62 is used to produce an estimate of oscillator frequency, which can be used to correct the setting of the frequency of the code generator 20. The code generator 20 also receives a sub-chip control input from correlator 56.

Correction of the code generator frequency allows the close tracking of the satellite code, optimising the correlation shape and value and maximising SNR. It is not estimated as a separate parameter (i.e. the correlation is not performed against it) because it is directly proportional to the satellite signal carrier frequency, which is already estimated.

CODE VALUE

Code value selection simply entails the selection of a satellite code to be used for each channel of the receiver. Each satellite has a code of epoch length 1023 chips, which it repeats at an epoch rate of 1 KHz. In the receiver, each satellite channel generates a replica of the code for the satellite from which it is to receive data. The locally-generated code is multiplied in code mixer 22 by the received satellite signal. If the local code has been delayed such that the codes are matched, the received signal is despread from the 2 MHz spread-spectrum bandwidth to the 100 MHz data bandwidth.

DATA VALUE ESTIMATES

The data value is determined by searching for data transitions. The correct polarity of the data is established in the data decoder 60 which contains a decoding algorithm. For the purposes of the signal processing, the data value is estimated as inverted or non-inverted, with the actual data, "1" or "0" being determined at a later stage. Transitions are located in time by filtering the phase of the data-modulated carrier with the filter 42 matched to a transition. Peaks in the matched filter output occur in the region of data transitions. Matched filtering is an optimal method of locating transitions and is accurate to within a small number of samples. Code epochs can be used to unambiguously locate the transitions, given the initial estimate from the matched filter 42. Since the matched filter locates the transitions to within a few samples (i.e. within hundreds of micro-seconds), and the data transitions always correspond to transitions of code epochs, which occur every 1 ms, unambiguous location of the transitions is possible if the locations of code epoch boundaries within an integration period are known. This is the method used in the receiver.

When the data transitions have been located and decoded, the information in the data contributes to other measurements. The timing information in the data is used to set time-of-week and allows the receiver to calculate the time of transmission of the edge used for pseudorange measurement. The ephemeris data is used to accurately locate the satellites, given the time of transmission.

PHASE, PHASE RATE (FREQUENCY) AND PHASE ACCELERATION ESTIMATES

The estimate of frequency in each of the satellite channels is simply the sum of all of the downconversions used to coherently detect the signal. Nominally, there are four such downconversions—in the analogue (downconverter 14) hardware (via the LO), in the digital hardware (upconverter 26) and two in the main processor (time-domain down converter 34 to the IIR filter prior 38 and one via the phase rotation in phase, rotator 52, both in time domain). Each of these conversions is nominally smaller than the previous one. Also, the measured value of each is proportional to the LO frequency. This is because the frequencies of the downconversions performed in the hardware and in the processor are all in terms of the sampling frequency, which is derived from the same source as the LO. In other words, LO drift causes a multiplying error in this measurement. However, due to the estimation of frequency differences, the first LO frequency offset is eliminated, and the drift only multiplies the downconversions performed in software.

The optimality accorded to the frequency estimate relates only to the last two downconversions—the first two are effectively "constants". The FFT unit 32 is a correlation in frequency, so estimating frequency for the first downconversion in the main processor via the FFT provides a ML estimate. The phase processing which uses averaging for the estimates of frequency and phase can be shown to be an optimal interpolation of the complex FFT estimates.

If the phase is measured at integration period boundaries, its measurement is also optimal. The phase contribution by the first LO is eliminated by the use of phase differences. Both the downconversion in the digital hardware and the FFT downconversion contribute zero phase to the signal at integration period boundaries. This is due to these downconversion "oscillators" having integral numbers of cycles in an integration period, and being initialised to zero. This means that the phase estimate is the average value estimated during the phase processing. To remove phase ambiguity the phase estimate must be "unwrapped" with respect to 2.

The phase acceleration is not optimal because it does not use all of the available information. It only uses the early and late integration periods, both of which will generally have lower SNR than the punctual.

DELAY ESTIMATE (PSEUDORANGE)

The estimate of delay is more complex than the others, but it is the most fundamental to the determination of receiver position. As discussed earlier, only differences between pseudoranges are estimated. The estimate requires input from both the estimate of code delay (which has a 1 ms ambiguity, but can be estimated easily since the code is known) and data delay (which has no ambiguity but is not known). A data transition that occurs in each channel is used for time-tagging the pseudorange measurement. This locates the data transition to within one sample, as described for the data value estimation. A data transition always coincides with a code epoch transition. Interpolation between samples is made possible by sampling the "phase" of code at the beginning and end of the integration period, to sub-chip accuracy. Given that the local code frequency is "locked" to the received code frequency to a degree that can be estimated, the point between samples where the transition occurs can be interpolated. If the local code was perfectly matched (in delay) to the received code, and there was no noise in the system, this interpolated pseudorange measurement would be perfectly correct.

However, the requirements to both maintain code lock and make an accurate estimate despite the system noise dictate that two further processing steps be taken. The first of these involves the picking of the correlation peak for the delay parameter, and the second involves the combination of a series of measurements taken over an observation period that ensures that the accuracy requirement is met.

The pseudorange estimates made using the above method have been called "raw pseudoranges". These estimates are not optimal because there is no relationship between these estimates and the correlation in the delay parameter. This is addressed by making three such estimates in three successive integration periods, each estimate being made for a different "phase" of the code. One of the integrations is made with the code set at the "best estimate" of the code phase (i.e. as close as estimable to "locked"). The other two are made at points part of a chip early and part of a chip late, giving a set of measurements as shown in FIG. 2. In order to find the accurate peak of the correlation, and thus correct the pseudorange measurement made at the "best" estimate, these three points must be used to reconstruct the correlation function shape. The optimal method of reconstruction is to correlate the three points with the expected correlation shape (shown in FIG. 2.). This estimate of pseudorange has been called "interpolated pseudorange", and is an optimal estimate, since correlation has been used (twice, effectively, since two estimates are made—one of correlation shape and one of correlation peak) in the estimate generation. However, despite the optimality of each estimate, they are still not accurate enough. Several (nominally at least 18) of these interpolated pseudoranges feed into the Kalman filter 62, which produces the final estimates of pseudorange and position. The phase and frequency estimates, as inputs to the Kalman filter, also contribute to the refining of the pseudorange estimate.

KALMAN FILTER

The function of the Kalman filter 62 is to track the "state" of a linear dynamic system by processing observations in an iterative least-squares fashion. The state of the system is described by a vector of system variables which must be related to each other by a known set of linear equations. Typically, the state vector consists of one or more sets of derivatives and hence the equations relating them are differential equations describing the dynamics of the system. The observations are made by measuring observables which must be known linear functions of the state variables.

FIG. 3 illustrates the operation of the Kalman filter. The observation vector, Y, consists of the three pseudorange differences and the three phase differences. The state vector is X, and consists of the receiver position, velocity and acceleration in three co-ordinates, and the rate of change of the local clock offset. The "hats" denote estimates or predictions.

The transition matrix $\phi$ is multiplied into $\hat{X}$ to obtain the estimate of the state vector for the next time interval. That loop is known as the state transition loop. Every N transitions an observation is made and a correction is made to $\hat{X}$. So, between observations, the transition matrix models the predicted dynamic behaviour of the receiver.

The corrections are made by comparing the predicted observation vector, $\hat{Y}$, to the observation vector, Y, and processing the prediction error vector that results. The latter is multiplied by the so-called Kalman Gain Matrix, K. The latter is computed via a stochastic modeling technique involving the state covariance matrix, P, the observation error covariance matrix, R, the system noise convariance matrix, Q, and the observation matrix, M. The observation matrix relates the measurement vector to the state vector.

The presence of subscripts on the matrices defining the model (e.g. $\phi$, Q, and M) indicates that these matrices must be updated regularly as they are not time-invariant. These matrices depend on the positions of the satellites and the receiver. In addition, Q and R may be estimated from the observations in various ways allowing the filter to adapt to changes in the dynamic behaviour of the receiver. Another way the filter may be caused to adapt is by multiplying it by a scalar factor related to the trace of an estimate of the prediction error concerned. Specifically, the scalar factor is $1+\alpha$ where $\alpha$ is linearly related to a sub-trace of the matrix $<(Y-\hat{Y})(Y-\hat{Y})T> - (MPMT+R)$.

An observation in the context of this Kalman filter is an input from the pseudorange interpolation algorithm, and an input from the frequency and phase estimators. After the required number of observations have been made, the estimated value of position can be output directly from the predicted state vector to the user. Similarly, the estimates of pseudorange differences to be transmitted to the base station under differential operation can be extracted directly from the predicted observation vector. When pseudorange corrections are available from the base station, these can be utilised to produce the more accurate position by feeding into the filter as illustrated in FIG. 3.

POSITIONING ALGORITHMS

The positioning algorithms used in this receiver are performed within the Kalman filter.

It is emphasised that the invention is not restricted to the embodiment described. Many changes and modifications may be made within the broad concepts described. The receiver design may be enhanced in several ways.

The generic concept as described here is relevant to receivers with four or more channels, known as "multi-channel" receivers.

With little effort the concept could be extended to applications such as three-channel marine receivers or single-channel multiplexing receivers. For the single-channel receiver, the important difference would be that absolute measurements of pseudorange, phase, and so on, would be required, rather than differences.

Other changes and modifications are envisaged to cater for particular applications and for special environmental conditions.

We claim:

1. In a GPS receiver for use with a satellite-based radio navigation system in which received signals from a plurality of satellites comprise a carrier signal modulated by phase reversals representing satellite-specific codes and data, said receiver comprising means for amplifying the signal received through an antenna, code generating means to generate any of said codes with a code delay of the generated code being controllable to sub-chip accuracy, code mixing and downconverting means to produce from the amplified signal a digital signal with a downconverted carrier frequency and multiplied by the generated code whereby the bandwidth of the portion of the digital signal originating from the satellite signal having the same code is despread when the code delay of the generated code matches or nearly matches the code delay of the satellite signal having the same code, means for computing signal parameters of the satellite signals including code delay, and means for utilizing said signal parameters from at least four of said satellite signals to provide information on the position of the antenna;

a method of determining the code delay of said satellite signal having the same code, said method comprising the steps of:
   (1) generating a plurality of said digital signals, each of said digital signals corresponding to a different code delay of the generated code from said code generating means;
   (2) computing a plurality of values corresponding to each digital signal, each value being a measure of the degree of code demodulation of the corresponding digital signal and utilizing both phase and frequency information; and
   (3) computing an optimum code delay of the generated code from said plurality of corresponding values to provide the code delay of said satellite signal.

2. A method as defined by claim 1, wherein said step of computing a plurality of values comprises the steps of:
   (1) computing a complex frequency spectrum of at least one of said digital signals over an integration period;
   (2) locating a maximum bin in said frequency spectrum; and
   (3) extracting the carrier frequency and carrier phase offset.

3. A method as defined by claim 1, wherein said step of computing a plurality of values comprises the steps of:
   (1) computing a complex frequency spectrum of at least one of said digital signals over an integration period;

(2) locating a maximum bin in said frequency spectrum; and (3) performing a further downconversion on each said digital signal in the time domain according to the position of said maximum bin to produce corresponding further downconverted signals with a residual carrier frequency.

4. A method as defined in claim 2, wherein said step of computing a plurality of corresponding values comprises the step of removing any data transitions from said at least one of said digital signals.

5. A method as defined in claim 3, wherein said step of computing a plurality of corresponding values comprises the step of removing any data transitions from said at least one of said further downconverted signals.

6. A method as defined in claim 1, wherein said plurality of said digital signals is generated sequentially.

7. In GPS receiver for use with a satellite-based radio navigation system in which received signals from a plurality of satellites comprise a carrier signal modulated by phase reversals representing satellite-specific codes and data, said receiver comprising means for amplifying the signal received through an antenna, code generating means to generate any of said codes with a code delay of the generated code being controllable to sub-chip accuracy, code mixing and downconverting means to produce from the amplified signal a digital signal with a downconverted carrier frequency and multiplied by the generated code whereby the bandwidth of the portion of the digital signal originating from the satellite signal having the same code is despread when the code delay of the generated code matches or nearly matches the code delay of the satellite signal having the same code, means for computing signal parameters of the satellite signals including code delay, and means for utilizing said signal parameters from at least four of said satellite signals to provide information on the position of the antenna;

A method of determining the code delay of said satellite signal having the same code, said method comprising the steps of:

(1) generating a plurality of said digital signals, each of said digital signals corresponding to a different code delay of the generated code from said code generating means; and (2) computing a plurality of values corresponding to each digital signal, each value being a measure of the degree of code demodulation of the corresponding digital signal and utilizing both phase and frequency information, said step of computing a plurality of values comprising the steps of (a) computing a complex frequency spectrum of at least one of said digital signals over an integration period;

(b) locating a maximum bin in said frequency spectrum; and (c) performing a further downconversion on each said digital signal in the time domain to produce corresponding further downconverted signals with zero frequency and phase; and (3) computing an optimum code delay of the generated code from said plurality of corresponding values to provide the code delay of said satellite signal.

8. A method as defined in claim 7, wherein said further downconversion to zero frequency and phase is performed in two steps, a first step comprising a downconversion according to said maximum frequency bin to a residual carrier frequency, and said step of computing a plurality of corresponding values further comprises the step of estimating the residual carrier frequency.

9. A method as defined in claim 8, wherein said step of computing a plurality of corresponding values further comprises the step of estimating the carrier phase offset of the further downconverted signal.

10. A method as defined in claim 8 wherein the digital signals and further downconverted signals are represented by a phase vector with in-phase (I) and quadrature (Q) components and the residual carrier frequency is estimated by measuring the rate of rotation of the phase vector of the further downconverted signals.

11. A method as defined in claim 10 wherein the rate of rotation of the phase vector is measured using a linear fit.

12. A method as defined in claim 7, wherein said step of performing a further downconversion to zero frequency and phase comprises the steps of rotating the phase vector to the real axis according to the measured carrier frequency and carrier phase offset, and said step of computing a plurality of values further comprises for each digital signal the steps of (1) detecting and removing any data transitions; and (2) summing real values of the rotated phase vector during the integration period to provide said corresponding value.

13. A method as defined in claim 2, wherein the code mixing and downconverting means performs said downconverted carrier frequency in two steps, a latter of said two steps being performed after said code mixing, the amount of downconversion performed in the latter step being adjustable according to said extracted carrier frequency or the value of said maximum bin.

14. A method as defined in claim 1, wherein the code mixing and downconverting means performs a downsampling of the signal to a sampling rate appropriate for further manipulation by computer software.

15. A method as defined in claim 1, wherein said step of computing an optimum code delay of the generated code from said plurality of said corresponding values comprises comparing said plurality of corresponding values with an expected relationship between the corresponding values and the code delay of said satellite signal and determining the code delay of the satellite signal which gives a best match between the expected relationship and the corresponding values.

16. A GPS receiver which operates by the method defined in claim 1.

17. A GPS receiver which operates by the method defined in claim 1, wherein the signal parameters computed by said means for computing signal parameters include pseudorange differences between said at least four of said satellite signals, said pseudorange differences being computed from the code delay of each of said satellite signals.

18. A GPS receiver which operates by the method defined in claim 1, wherein the signal parameters computed by said means for computing signal parameters includes carrier phase offset computed from said digital signals.

19. A GPS receiver which operates by the method defined in claim 1, wherein the signal parameters computed by said means for computing signal parameters includes carrier phase acceleration computed from said digital signals.

20. A GPS receiver which operates by the method defined in claim 1, wherein the signal parameters computed by said means for computing signal parameters includes a carrier frequency computed from said digital signals.

21. A GPS receiver which operates by the method defined in claim 8, wherein the signal parameters computed by said means for computing signal parameters include a carrier frequency computed by summing the estimated residual carrier frequency, the amount of further downconversion in said first step and the amount of downconversion performed by said code mixing and downconverting means.

22. A GPS receiver which operates by the method defined in claim 10, wherein the signal parameters include phase acceleration computed by measuring the rate of change of the rate of rotation of the phase vector.

23. A GPS receiver which operates by the method as defined in claim 1, wherein said means for utilizing said signal parameters includes a Kalman filter with said signal parameters as inputs.

24. A GPS receiver which operates by the method defined in claim 7, wherein said means for utilizing said signal parameters includes a Kalman filter with said signal parameters as inputs and said signal parameters include:

(1) a carrier phase offset;

(2) a carrier phase acceleration;

(3) psuedorange differences between the satellite signals derived from the code delays of the satellite signals; and (4) the carrier frequency.

25. A GPS receiver as defined in claim 24 wherein said further downconversion to zero frequency and phase is performed in two steps, a first step comprising a downconversion according to said maximum frequency bin to a residual carrier frequency, and wherein the carrier frequency is computed using the amount of further downconversion in said first step and the residual carrier frequency.

* * * * *